(12) United States Patent
Lipson et al.

(10) Patent No.: US 11,662,643 B2
(45) Date of Patent: May 30, 2023

(54) CHIP-SCALE OPTICAL PHASED ARRAY FOR PROJECTING VISIBLE LIGHT

(71) Applicant: The Trustees of Columbia University in the City of New York, New York, NY (US)

(72) Inventors: Michal Lipson, New York, NY (US); Min Chul Shin, New York, NY (US); Aseema Mohanty, New York, NY (US); Kyle Watson, Solana Beach, CA (US)

(73) Assignee: The Trustees of Columbia University in the City of New York, New York, NY (US)

( * ) Notice: Subject to any disclaimer, the term of this patent is extended or adjusted under 35 U.S.C. 154(b) by 0 days.

(21) Appl. No.: 16/872,107

(22) Filed: May 11, 2020

(65) Prior Publication Data
US 2020/0355983 A1 Nov. 12, 2020

Related U.S. Application Data

(60) Provisional application No. 62/845,552, filed on May 9, 2019.

(51) Int. Cl.
*G02F 1/295* (2006.01)
*G02B 6/26* (2006.01)
(Continued)

(52) U.S. Cl.
CPC ....... *G02F 1/2955* (2013.01); *G02B 6/12033* (2013.01); *G02B 6/26* (2013.01); *G02F 1/218* (2013.01)

(58) Field of Classification Search
CPC ......... G02F 1/2955; G02F 1/218; G02B 6/26; G02B 6/12033
See application file for complete search history.

(56) References Cited

U.S. PATENT DOCUMENTS

| | | | |
|---|---|---|---|
| 4,507,659 A * | 3/1985 | Lewis ................... | G01S 13/288 342/201 |
| 8,988,754 B2 * | 3/2015 | Sun ..................... | G02B 6/12033 359/238 |

(Continued)

OTHER PUBLICATIONS

August et al., "Compressive sensing spectrometry based on liquid crystal devices," Opt. Lett., OL, vol. 38, (2013), 4996-4999.
(Continued)

*Primary Examiner* — Ellen E Kim
(74) *Attorney, Agent, or Firm* — BakerHostetler

(57) ABSTRACT

Methods and systems are described for adjusting an optical signal. An example device can comprise a plurality of waveguides. The device can comprise an interference structure optically coupled to the plurality of waveguides and configured to receive an optical signal and distribute the optical signal to the plurality of waveguides as a plurality of optical signals. The device can comprise a plurality of phase shifters coupled to corresponding waveguides of the plurality of waveguides and configured to adjust the phase of one or more of the plurality of optical signals. The device can comprise a plurality of emitters optically coupled to corresponding outputs of the plurality of phase shifters and configured to output the adjusted plurality of optical signals. The adjusted plurality of optical signals can be output as light patterns reconfigurable in at least one dimension.

20 Claims, 7 Drawing Sheets
(6 of 7 Drawing Sheet(s) Filed in Color)

(51) Int. Cl.
*G02B 6/12* (2006.01)
*G02F 1/21* (2006.01)

(56) References Cited

U.S. PATENT DOCUMENTS

| | | | |
|---|---|---|---|
| 9,557,585 B1* | 1/2017 | Yap | G01S 7/4815 |
| 9,977,266 B2* | 5/2018 | Sugamata | G02F 1/225 |
| 2010/0103309 A1 | 4/2010 | Stern | |
| 2017/0003507 A1* | 1/2017 | Raval | G02B 27/0176 |
| 2017/0016990 A1 | 1/2017 | Watts et al. | |
| 2019/0004151 A1* | 1/2019 | Abediasl | G02F 1/292 |

OTHER PUBLICATIONS

Doylend et al., "Two-dimensional free-space beam steering with an optical phased array on silicon-on-insulator," Opt. Express, OE, vol. 19, (2011), 21595-21604.

Komljenovic et al., "Sparse aperiodic arrays for optical beam forming and LIDAR," Opt. Express, OE, vol. 25, (2017), 2511-2528.

Miller et al., "512-Element Actively Steered Silicon Phased Array for Low-Power LIDAR, in Conference on Lasers and Electro-Optics," paper JTh5C.2 JTh5C.2 (Optical Society of America, 2018). doi:10.1364/CLEO_AT.2018.JTh5C.2, (2018).

Power et al., "A guide to light-sheet fluorescence microscopy for multiscale imaging," Nature Methods, vol. 14, (2017), 360-373.

Satat et al., "Lensless Imaging With Compressive Ultrafast Sensing," IEEE Transactions on Computational Imaging, vol. 3, (2017), 398-407.

Sun et al., "3D Computational Imaging with Single-Pixel Detectors," Science, vol. 340, (2013), pp. 844-847.

Sun et al., "Large-scale nanophotonic phased array," Nature, vol. 493, (2013), pp. 195-199.

Sun et al., "Single-pixel three-dimensional imaging with time-based depth resolution," Nature Communications, vol. 7, (2016), 12010.

* cited by examiner

CHIP-SCALE OPTICAL PHASED ARRAY FOR PROJECTING VISIBLE LIGHT

GOVERNMENT RIGHTS

This invention was made with government support under contract no. HR0011-17-2-0034 awarded by the Department of Defense/Defense Advanced Research Projects Agency. The government has certain rights in the invention.

CROSS-REFERENCE TO RELATED APPLICATIONS

This application is related to U.S. Patent Application No. 62/845,552, "Chip-Scale Visible Optical Phased Array For Imaging And Projection Displays" (filed May 9, 2019), which application is hereby incorporated by reference in its entirety for any and all purposes.

BACKGROUND

Today devices for three-dimensional optical pattern generation for visible light are limited to bulky table-top optical components such as liquid-crystal based spatial light modulators (SLM), digital micromirror devices (DMD), and acousto-optic deflectors (AOD) which are limited in their portability, steering angle, speed, and power consumption. Many imaging methods and displays rely on structured light patterns from a thin light sheet to complex 3D light patterns. However, these methods are limited to table top systems due to their size. To be able to use these as wearable, implantable devices or embedded within handheld electronic devices, they should to be reduced to the millimeter scale. Thus, there is a need for more sophisticated optical devices.

SUMMARY

Methods and systems are described for adjusting an optical signal. An example device can comprise a plurality of waveguides. The device can comprise an interference structure optically coupled to the plurality of waveguides and configured to receive an optical signal and distribute the optical signal to the plurality of waveguides as a plurality of optical signals. The device can comprise a plurality of phase shifters coupled to corresponding waveguides of the plurality of waveguides and configured to adjust the phase of one or more of the plurality of optical signals. The device can comprise a plurality of emitters optically coupled to corresponding outputs of the plurality of phase shifters and configured to output the adjusted plurality of optical signals. The adjusted plurality of optical signals can be output as light patterns reconfigurable in at least one dimension.

An example method can comprise receiving, via a first waveguide disposed on a chip, an optical signal. The method can comprise distributing the optical signal to a plurality of second waveguides as a plurality of optical signals. The method can comprise adjusting the phase of one or more of the plurality of optical signals. The method can comprise outputting, from the chip, the adjusted plurality of optical signals. The adjusted plurality of optical signals can be output as light patterns reconfigurable in at least one dimension.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

The file of this patent or application contains at least one drawing/photograph executed in color. Copies of this patent or patent application publication with color drawing(s)/photograph(s) will be provided by the Office upon request and payment of the necessary fee.

The accompanying drawings, which are incorporated in and constitute a part of this specification, illustrate embodiments and together with the description, serve to explain the principles of the methods and systems.

DETAILED DESCRIPTION OF ILLUSTRATIVE EMBODIMENTS

Provided are devices, methods, and systems for outputting reconfigurable light patterns (e.g., three-dimensional patterns) in the visible wavelength range (e.g., on a compact chip scale, using no moving parts). The disclosed device can be based on an optical phased array using silicon nitride waveguides. One can use silicon nitride because it has a transparency window from 400 nm to 5 µm and has a high index contrast for compact bends and interference structures. The optical phased array can comprise an interference structure that splits the input light into an array of waveguides. Each waveguide can have a corresponding electronically controlled phase shifter (e.g., embedded on the chip) that can put an arbitrary phase on the light in each waveguide. In one exemplary implementation, an example phase shifter can comprise microheaters disposed on top of the waveguides. The phase shifters can apply temperature changes (e.g., locally applied to specific corresponding waveguides) to thermo-optically shift the phase. Interferometric structures can be optically coupled into each waveguide path as well for amplitude modulation. The output from the phase shifters can be sent to an arrangement of a plurality of emitters. The plurality of emitters can be arranged in a one-dimensional array, two-dimensional grid, or other pattern (e.g., determined using an optimization algorithm). The plurality of emitters can comprise waveguides (e.g., configured to output light from the edge of the chip), grating structures (e.g., configured to output light perpendicular to the surface of the chip), a combination thereof, and/or the like.

The plurality of emitters can be disposed in an arrangement (e.g., or pattern) selected to achieve a large field of view and steering angle. The arrangement of the plurality of emitters can comprise sparse spacings, random spacings, aperiodic spacings, and/or the like. The arrangement can eliminate (e.g., minimize) grating lobes that typically limit the field of view of periodically arranged emitter arrays that have greater than half the wavelength spacings. The emitter spacing can be optimized using optimization algorithms (e.g., genetic algorithms) to maximize (e.g., or increase to a threshold level) the peak sidelobe ratio (PSLR) of the beam formed. The disclosed device can be configured to redistribute the power in the grating lobes to form a uniform background haze thereby maintaining a high-resolution beam over a wide field of view. The disclosed device can be configured to achieve beam formation with a fewer number of elements than conventional devices. The disclosed device can use emitter spacings larger than the wavelength of the optical signals. Thus, the disclosed devices allow for relaxing of fabrication constraints at these shorter wavelengths.

Figure 1A:
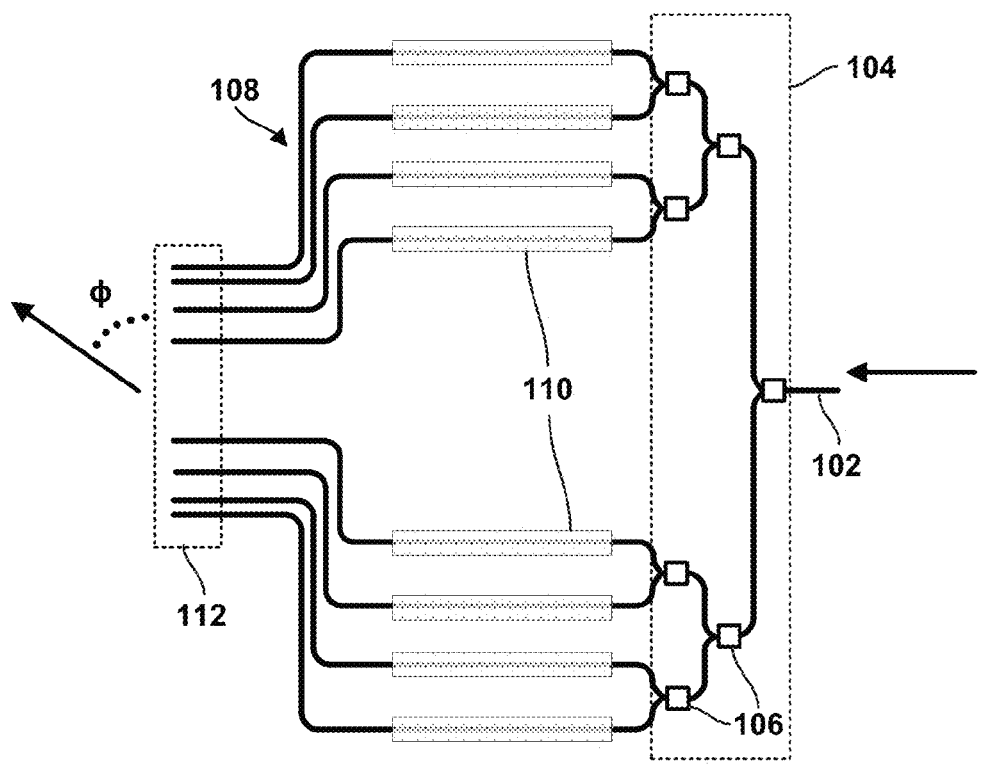
FIG. 1A shows an example device for emitting visible light.
Figure 1B:
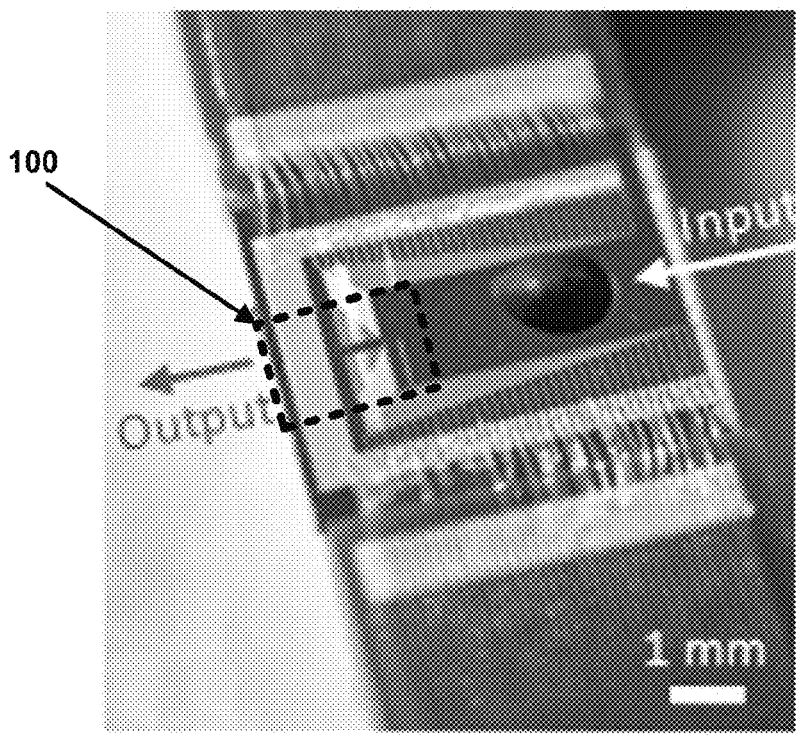
FIG. 1B shows an example fabricated and packaged chip comprising the example device of FIG. 1A.

FIG. 1A shows an example device 100 for emitting visible light. The device 100 may comprise an optical phased array. Unlike conventional devices, the device 100 may be able to emit visible light with components at the chip-scale (e.g., and without moving mechanical parts). As shown in FIG. 1B, the device 100 (e.g., optical phased array) may be disposed on an integrated chip. The integrated chip can comprise is a set of electronic components on a substrate, such as on a single small (e.g., a portion cut from a wafer) flat piece of semiconductor material (e.g., silicon). The device 100 can be an electronic component of the integrated chip. The integrated chip may be disposed in a portable device (e.g., personal portable device, mobile device, smart device, smart glasses, mobile phone), a holographic device (e.g., device that projects beams into space to form 2D and/or 3D representations of objects, a detection device (e.g., a device that detects reflections of optical signals from the device 100), an augmented reality device, a content device, a virtual reality device, an implantable device (e.g., neural implant device), medical device, a ophthalmic device (e.g., electronic contact lens, electronic lens implant), wearable device, and/or the like. The integrated chip can comprise or be part of a device comprising a detector. The device 100 (e.g., the integrated chip, the detector) can be part of an imaging system (e.g., 2D and/or 3D imaging system).

The device 100 can be made very compact such that the device 100 can be part of or itself be a portable and/or implantable device for receiving and distributing 3D optical signals. For example, the device 100 can be implanted in a medical device, embedded on wearable electronics, integrated in a next generation display technology, and/or the like. Typical methods to create optical patterns are bulk optics, but in contrast, the disclosed device 100 can us chip-scale optics which allows the device 10 to be very compact and can be embedded onto portable and implantable devices. The device 100 can be fabricated using standard nanofabrication techniques. The device 100 can be formed on a thin substrate as small as about 20 μm (e.g., between one or more of about 10 μm and about 100 μm, about 20 μm and about 100 μm, about 10 μm and about 50 μm, or about 20 μm and about 50 μm). The device 100 may have a length and/or a width that is less than one or more of about 2 mm, about 5 mm, or about 10 mm. The device 100 (e.g., or integrated chip) can have a width (e.g., or length) below about a mm (e.g., between one or more of about 10 mm and about 500 μm, about 1 mm and about 500 μm, about 1 mm and about 100 μm, about 1 mm and about 10 μm, or about 1 mm and about 1 μm). This size allows the device 100 to be attached or integrated easily with electronic or other optical devices, such as microscope objectives.

Returning to FIG. 1A, the device 100 can comprise an input 102. The input may be configured to receive an optical signal, such as an optical signal in the visible wavelength range. The visible wavelength range can comprise about 400 nm to about 740 nm or about 380 nm to about 740 nm. The optical signal can be received (e.g., via an optical fiber) from another component of the integrated chip. The integrated chip and/or the device 110 can be without moving parts (e.g., without mechanically moving parts). In some implementations, the optical signal may be outside the visible wavelength range (e.g., but may be shifted to the visible wavelength range by the device 100).

The device 100 can comprise an interference structure 104. The interference structure 104 can be disposed on the integrated chip. The interference structure 104 can be configured to receive the optical signal from the input 102. The interference structure 104 can be configured to split the optical signal into a plurality of optical signals. The interference structure 104 can be configured to carry optical signals in the visible wavelength range.

The interference structure 104 can be configured to output (e.g., distribute) the plurality of optical signals to a plurality of waveguides 108. The interference structure 104 can be optically coupled to the plurality of waveguides 108. The plurality of waveguides 108 can comprise one or more or silicon, nitrogen, or silicon nitride. The plurality of waveguides 108 can be configured to carry optical signals in the visible wavelength range.

The interference structure 104 can comprise a plurality of interference elements 106 (e.g., interferometric structures). The plurality of interference elements 106 can be optically coupled to corresponding waveguides of the plurality of waveguides 108. The plurality of interference elements 106 can be configured to effect amplitude modulation of the plurality of optical signals. The plurality of interference elements 106 can comprise multimode interference structures (e.g., multimode interference couplers). The multimode interference structures can comprise 1×2 multimode interference structures (e.g., with 1 input and 2 outputs).

The device 100 can comprise a plurality of phase shifters 110. The plurality of phase shifters 110 can be disposed on the integrated chip. The plurality of phase shifters 110 can be coupled to corresponding waveguides of the plurality of waveguides 108. The plurality of phase shifters 110 can be configured to adjust the phase of one or more of the plurality of optical signals. The plurality of phase shifters 110 can be configured to adjust the phase based on one or more of an electro-optic or a thermo-optic effect in the corresponding waveguides of the plurality of waveguides 108. The plurality of phase shifters 110 can comprise heaters disposed on the plurality of waveguides 108. The plurality of phase shifters 110 can be configured to shift the phase of optical signals in the visible wavelength range. The plurality of phase shifters 110 may be configured to provide phase shifting at GHz speeds. The plurality of phase shifters 110 may be electrically controlled (e.g., using wires that are not shown in FIG. 1A, for example, each phase shifter may have its own wire that can be separately controlled).

The device 100 can comprise a plurality of emitters 112. The plurality of emitters 112 can be disposed on the integrated chip. The plurality of emitters 112 can be optically coupled to corresponding waveguides of the plurality of waveguides 108 (e.g., or outputs of the plurality of phase shifters 110). The plurality of emitters 112 can be configured to receive the adjusted plurality of optical signals from the plurality of waveguides 108. The plurality of emitters 112 can be configured to output (e.g., from the integrated chip) the adjusted plurality of optical signals. Outputting the adjusted plurality of optical signals can comprise projecting the adjusted plurality of optical signals into free-space as light patterns. The plurality of emitters 112 can be configured to emit optical signals in the visible wavelength range. The adjusted plurality of optical signals can be output (e.g., or projected) in the visible wavelength range.

The plurality of emitters 112 can comprise a plurality of waveguides emitters. The plurality of emitters 112 (e.g., waveguide emitters) can be configured to output the adjusted plurality of optical signals from an edge of the chip (e.g., in a direction parallel to the surface of the integrated chip on which the waveguide emitters are disposed). The plurality of emitters 112 can comprise a plurality of grating structures. The plurality of emitters 112 (e.g., grating structures) can be disposed on a surface of the integrated chip. The plurality of emitters 112 (e.g., grating structures) can be configured to output the adjusted plurality of optical signals perpendicular to the surface of the integrated chip. The plurality of emitters 112 can comprise a combination of one or more waveguide emitters and one or more grating emitters.

The plurality of emitters 112 can be disposed (e.g., on the integrated chip) in an arrangement (e.g. pattern). The arrangement can comprise a one dimensional array, a two dimensional grid, an irregular pattern, an optimized pattern (e.g., 1D or 2D pattern), or a combination thereof. The plurality of emitters 112 can be sparsely spaced (e.g., spaced at a distance larger than a wavelength of the adjust plurality of optical signals), aperiodically spaced (e.g., irregular, not having a regular period), spaced to achieve a uniform modulation transfer function (MTF), or a combination thereof. The MTF can comprise the amplitude of the Fourier transform of the point spread function of the arrangement of the plurality of emitters.

The plurality of emitters 112 can be disposed in an arrangement selected to eliminate grating lobes, maximize peak sidelobe ratios, minimized power usage, and/or the like. One or more of a dimension or an arrangement of one or more of the plurality of waveguides 108, the plurality of phase shifters 110, or the plurality of emitters 112 can be optimized for one or more of minimal power consumption, decreased noise (e.g., increased signal-to-noise ratio) of an output beam, and/or the like.

The arrangement of the plurality of emitters 112 can be determined based on an algorithm. The arrangement can be configured (e.g., selected, determined) by using an optimization algorithm. The optimization algorithm can be configured to maximize a peak sidelobe ratio (PSLR) of a beam formed (e.g., from one or more of the plurality of adjusted optical signals). The optimization algorithm can comprise a genetic algorithm, an evolutionary algorithm, iterative algorithm, a heuristic, and/or the like. The optimization algorithm can generate proposed arrangements for the plurality of emitters. The proposed arrangements can be evaluated against an objective (e.g., objective function). The objective can comprise achieving a threshold peak sidelobe ratio, achieving a power efficiency, eliminating grating lobes and/ or the like. If the proposed arrangements do not satisfy the objective, then new proposed arrangements can be determined (e.g., generated either randomly or based on some function). Additional arrangements can be determined and evaluated by an iterative process until the objective is satisfied. The final arrangements can be used for disposing the plurality of emitters 112.

The light patterns can be spatially reconfigurable in at least one dimension (e.g., in two dimensions, in three dimensions). The light patterns can be reconfigured by using beam steering. The plurality of phase shifters 110 can be electronically controlled to reconfigure the light patterns. The light patterns can be reconfigurable to form one or more of holographic features, two-dimensional images, or three-dimensional representations (e.g., of objects). The light patterns can be reconfigured to show motions and/or changes in the holographic features, two-dimensional images, and/or three-dimensional representations.

The light patterns (e.g., the adjusted plurality of optical signals) output from the plurality of emitters 112 can comprise a line, a sheet of light (e.g., light in a 2D plane), one or more points (e.g., 2D and/or 3D points, spots, sphere, cube, etc), other volumetric features, or a combination thereof. The device 100 can be configured to output (e.g., simultaneously) a plurality of lines, sheets, and/or dots (e.g., in different spatial locations in 3D space). The device 100 can be configured to output the lines, sheets of light, the one or more points, the other volumetric features, and/or other light patterns by raster scanning (e.g., point by point scanning, line by line scanning).

The light patterns (e.g., the adjusted plurality of optical signals) can be one or more of focused in a near field region (e.g., focused in the reactive near field region, focused in the radiating near field region) or collimated in a far-field region (e.g., Fraunhofer region). If focused in the near field region, the light patterns can be reconfigured to form any arbitrary 2D or 3D pattern. If focused in the far field region, the light patterns can be reconfigured to form any 2D pattern.

For an emitter, there are three regions describing the emitted fields at a certain distance: reactive near field, radiating near field (Fresnel region), and far-field (Fraunhofer region). As used herein, the near field region can comprise one or both of the reactive near field region or the radiating near field region. The Fraunhofer region can be referred to as the far field region. The far field region is defined as any distance more than (e.g., or more than about) $2*D^2$/lambda, where D is the aperture size or total extent of the emitters and lambda is the operating wavelength. In the far field region, the device 100 can reconfigure and/or shape the light patterns in two dimensions (e.g., but may not be configured to reconfigure the light patterns \ in the propagating dimension). The near field can be defined as any distance shorter than the far field region (e.g., down to a couple of wavelengths from the emitters). In the near field region, the device 100 can reconfigure and/or shape the light patterns in three dimensions (e.g., including the propagating dimension). This allows for 3D volumetric shapes to be formed.

In some scenarios the integrated chip may comprise only the circuit elements described above, such as one or more of the input 102, the interference structure 104, the plurality of waveguides 108, the plurality of phase shifters 110, or the plurality of emitters 112. The circuit elements can be included on an integrated chip that comprises additional circuit elements, such as detectors (e.g., photodiodes), and/ or the like. Multiple integrated chips comprising the circuit elements described above may be integrated into a single device and used in parallel (e.g., simultaneously). For example, one integrated chip may provide light patterns in one spatial region (e.g., near field, far field, or any geometric space) while another integrated chip may provide light patterns in another spatial region.

Additional examples, aspects, and embodiments are described below. Any of the examples, aspects, and embodiments may be combined with each other and/or the above disclosure to form an example device according to the disclosed techniques.

Figure 2:
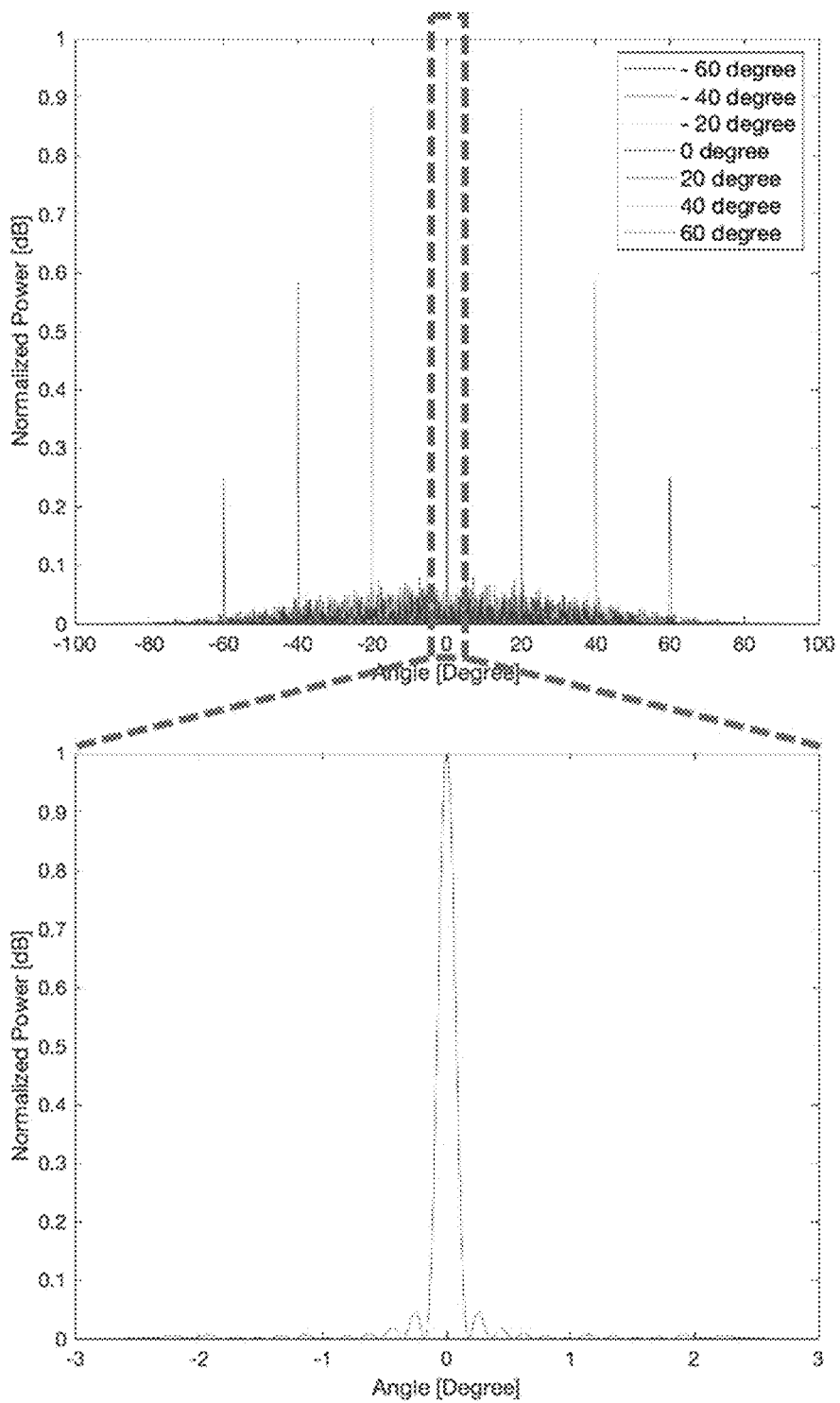
FIG. 2 shows a simulation of beam-stearing for the example device.

As shown in FIG. 1B, an example one-dimensional (1D) 64-channel blue phased array was formed. One of ordinary skill in the art understands that the example device is just one of many examples for implementing the disclosure. The disclosure is not limited to this application, or the example steering range and beam widths disclosed. Steering range can be increased and beam width can be configured based on design requirements. In this exemplary, non-limiting embodiment, it has been demonstrated that an example device can perform beam steering of blue light (488 nm) over a 60° field of view with a beam width of less than 0.157°. FIG. 2 shows a simulation of example beam steering with the example device. The main beam centered at 0° has a peak sidelobe ratio of 13.1 dB. The example device included a plurality of waveguides comprising silicon nitride. The plurality of waveguides were patterned with electron beam lithography and etched using a fluorine-based chemistry. The example device included thermo-optic phase shifters. The thermo-optic phase shifters included microheaters. The microheaters were platinum microheaters. The microheaters were disposed on top of silicon dioxide cladding. The cladding was disposed using plasma-enhanced chemical vapor deposition. The output of the phase shifters is routed to a plurality of emitters (e.g., an array of emitters, the ends of the waveguides). The plurality of emitters were spaced (e.g., randomly spaced, sparsely spaced, aperiodically spaced) in an arrangement. The arrangement spanned 965 µm. The plurality of emitters output (e.g., project, emits) light from the edge of the integrated chip. The integrated chip was attached to a heat sink. The integrated chip was wire bonded to a printed circuit board (PCB). The printed circuit board was connected to digital to analog converters.

Figure 3A:
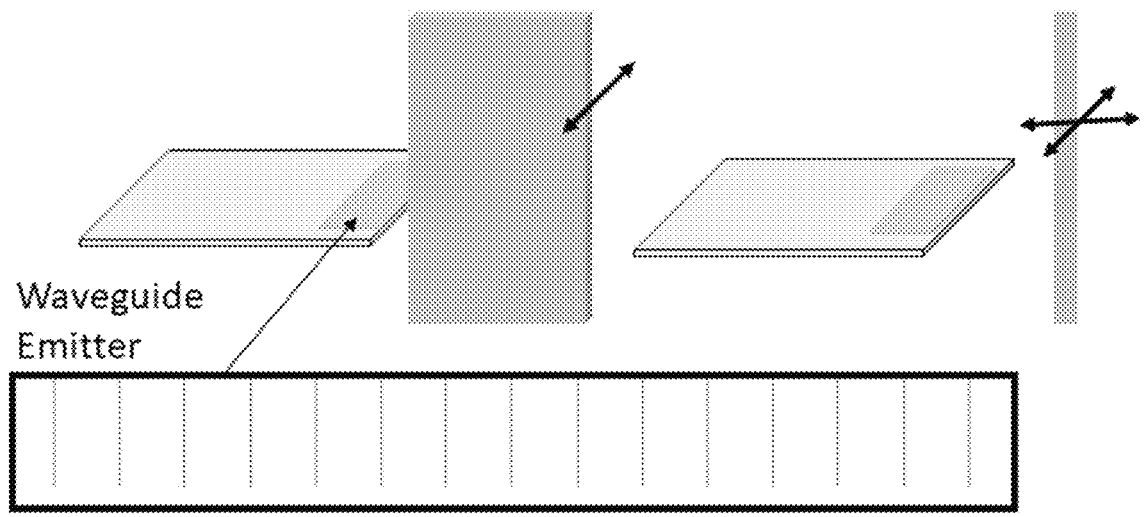
FIG. 3A shows an example device comprising waveguide emitters.
Figure 3B:
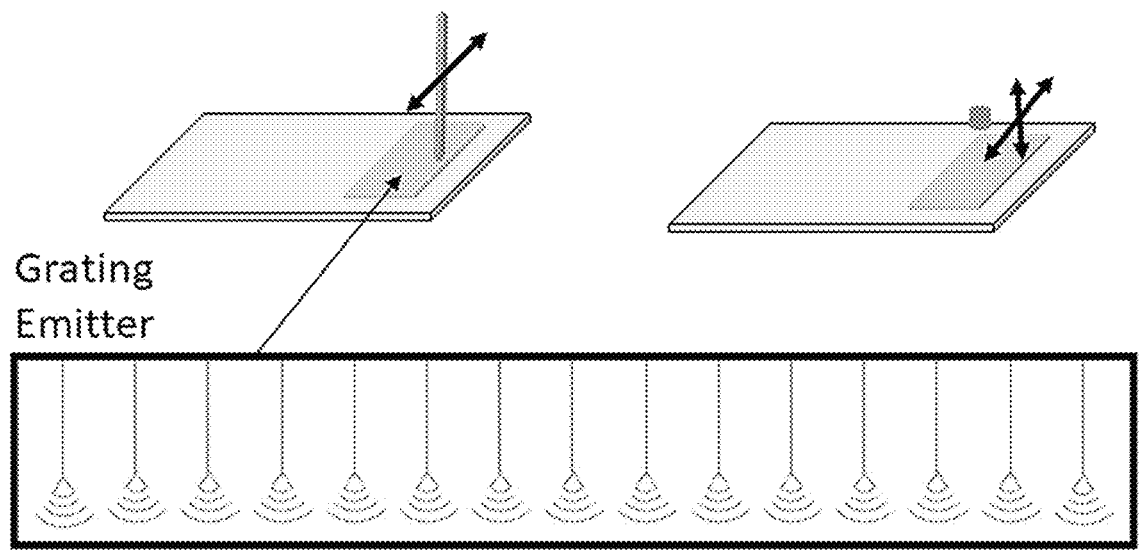
FIG. 3B shows an example device comprising grating emitters in a 1D array.
Figure 3C:
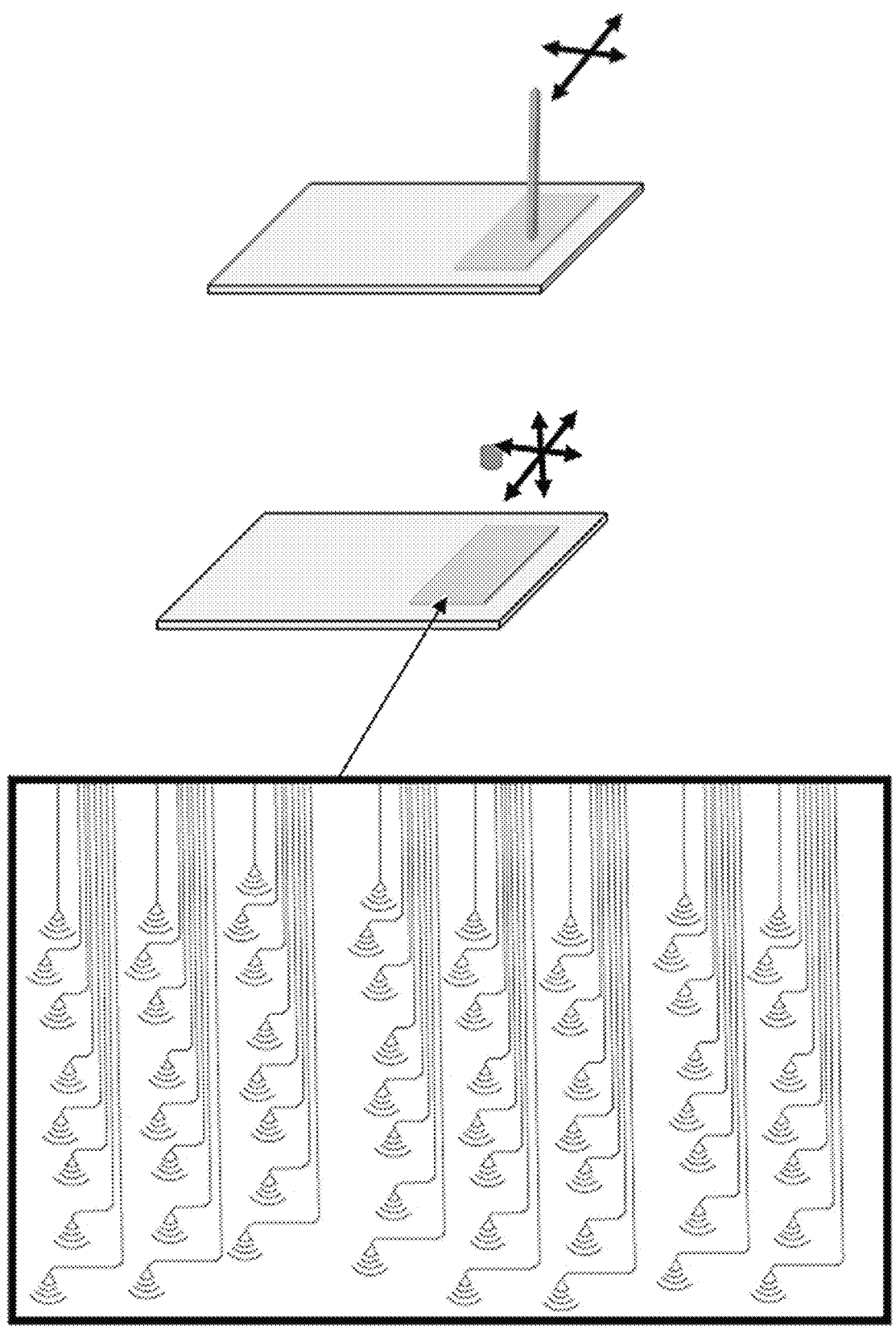
FIG. 3C shows an example device comprising grating emitters in 2D array.

FIGS. 3A-3C show several arrangements of emitters and corresponding light patterns that can be output by the arrangements. The plurality of emitters (e.g., the plurality of emitters 112 of FIG. 1A) can be arranged in 1D and/or 2D layout to produce different types of optical patterns (e.g., different volumetric optical patterns).

FIG. 3A shows an example device comprising example emitters. A plurality of emitters can be configured to perform beam forming from the edge of an integrated chip in one and two dimensions. The plurality of emitters shown can comprise a plurality of waveguide emitters. The plurality of waveguide emitters can be disposed in an array (e.g., with emitting ends up to the end of the integrated chip). The plurality of emitters can be configured to form a beam in the forward propagation direction. On the top left, output light patterns are in the form of a sheet of visible light. The sheet of light can be formed using a linear phase ramp. On the top right, the output optical signals can be focused to the near field. This allows for a beam to be steered in two dimensions as shown.

FIG. 3B shows an example device comprising example emitters. The example device can be configured to perform beam forming perpendicular to an integrated chip in one and two dimensions. As shown on the bottom, the plurality of emitters can comprise grating emitters. The grating emitters can be arranged in a 1D array. On the top left, output light patterns are in the form of a beam perpendicular to the integrated chip. A linear phase ramp can be used to steers a sheet (e.g., or beam) in one dimension. On the top right, the output optical signals can be focused in the near field. This configuration allows for the beam (e.g., or spot) to be steered in two dimensions as shown.

FIG. 3C shows an example device comprising example emitters. A plurality of emitters can comprise grating emitters. As shown at the bottom, the plurality of emitters can be arranged in a 2D array. The plurality of emitters can be configured to perform beam forming perpendicular to the integrated chip in two and three dimensions. On the top, a beam perpendicular to the integrated chip can be steered in two dimensions. In the middle, the output optical signals can be focused in the near field. Near field focusing allows for the beam to be steered in three dimensions as shown.

In a 1D configuration (e.g., as shown in FIGS. 3A and 3B), the light diverges significantly in one direction (e.g., size determined by the radiation pattern of the emitter). The light can remain collimated in the other dimension (e.g., size determined by the effective aperture of the emitters, or the overall spatial length spanned by the emitters). The result is a sheet of light that can be scanned. In a 2D configuration (e.g., as shown in FIG. 3C), a spot can be formed. The spot can be a collimated spot in the far field (e.g., Fraunhofer region). The spot can have a size determined by the effective emitter aperture in both dimensions. The spot can be scanned. In both the 1D and 2D configurations, by using a parabolic phase ramp, the light can be focused in the near field (e.g., Fresnel region) creating a more localized spot of light in the axial dimension. In the 1D case, the use of the phase ramp can result in a line. In the 2D case, the use of the phase ramp can cause output of light in the pattern of a spot. This focus can be moved throughout the extent of the near field (e.g., Fresnel region). In both cases, the phases can be randomized to create multiple points to form and image or a random optical pattern, which can be reconfigured arbitrarily. Similarly, every point can either be raster scanned or generated simultaneously.

Figure 4A:
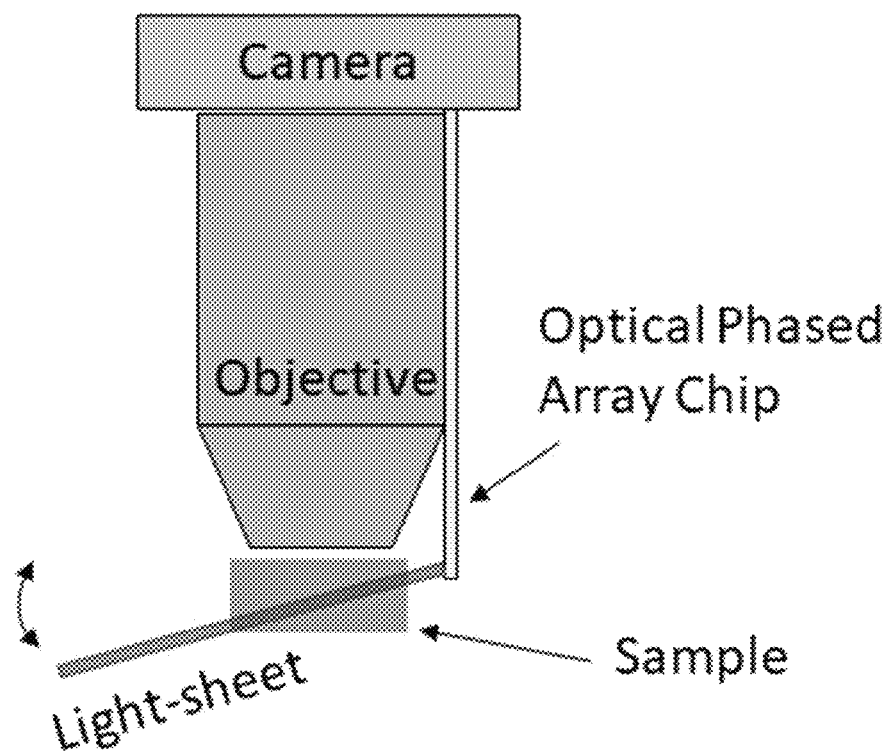
FIG. 4A shows an example device implemented for light sheet microscopy.

Methods of Use of the Proposed Device Among Others are:

FIG. 4A shows an example device implemented for a light sheet microscopy. In a conventional setup, a microscope objective and cylindrical lens can be used to create a sheet of light to excite fluorescent markers in a sample. Another microscope objective can be used to image the sample in a perpendicular arrangement. This high quality optical sectioning allows for excellent high contrast imaging by reducing the amount of background noise in the image. However, this conventional approach creates a bulky setup that is limited by the two objectives. The disclosed device (e.g., optical phased array chip) can be used to improve upon this conventional approach. An example microscopy device can comprise an integrated chip configured according to disclosed techniques. The integrated chip can comprise a plurality of emitters arranged in a 1D configuration as disclosed herein. The microscopy device can be configured to output a thin sheet of light (e.g., by converging beams of light in one dimension and diverging beams of light in the other dimension in the far-field). The sheet of light can be scanned continuously to different angles by using the phase shifters. The thickness of the sheet can be controlled by focusing in the near field (e.g., Fresnel region). The width of this sheet of light can be diffraction limited which is sufficient for most biological imaging applications.

Figure 4B:
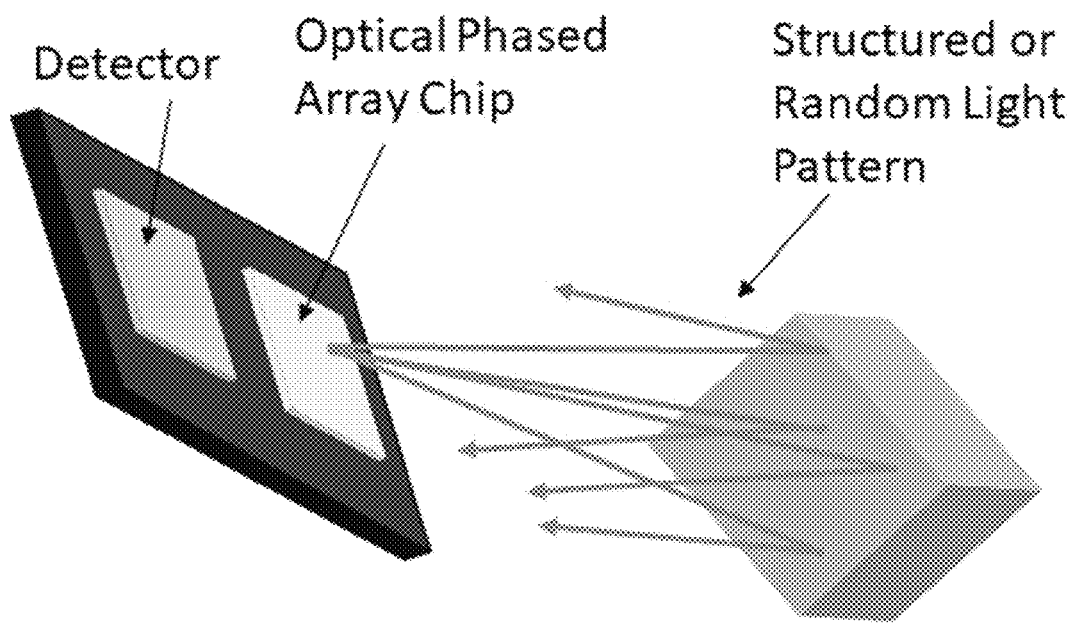
FIG. 4B shows an example device implemented in a computational imaging and compressive sensing device.

FIG. 4B shows an example device implemented in a computational imaging and compressive sensing device. Single pixel imaging systems and/or lensless imaging systems can use structured illumination and a single pixel photodiode (e.g., or a CCD) to capture a 3D image. Typically, a DMD or SLM is used to create the structured or patterned light in 2 or 3 dimensions. An example device can comprise an integrated chip (e.g., optical phased array chip) as disclosed herein). The plurality of emitters can be arranged in a 2D arrangement (e.g., using grating emitters) as disclosed herein. The device can comprise a detector, such as a photodiode (e.g., thereby even further reducing the size of this system to the chip-scale). Compressive sensing techniques may require a specific set of light pattern generation that are sparse, and this can be done using the proposed device.

Figure 4C:
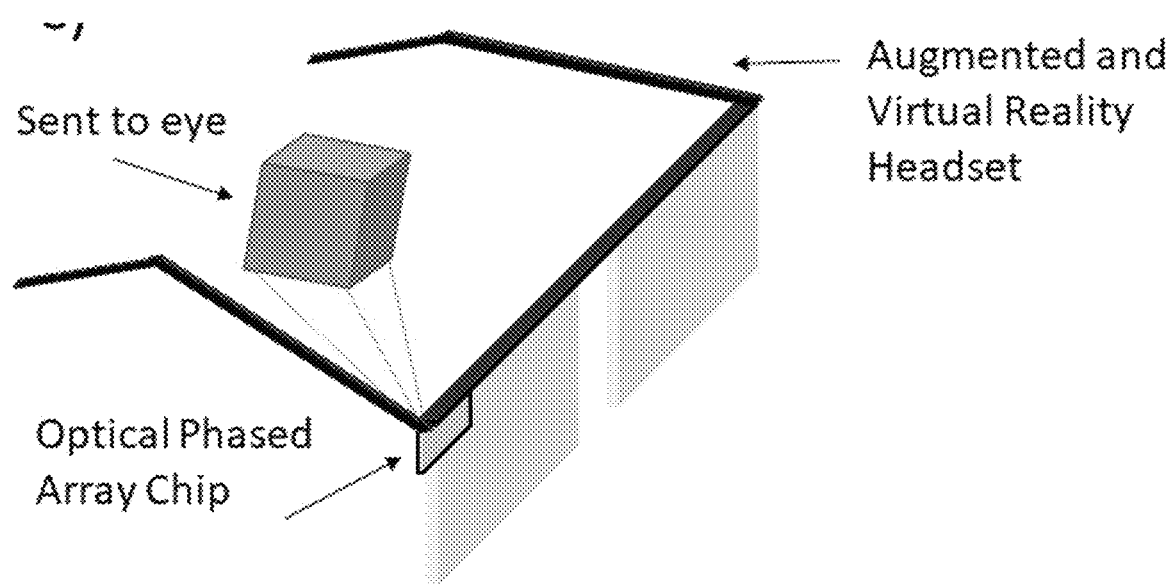
FIG. 4C shows an example device implemented for a headset display.

FIG. 4C shows an example device implemented for a headset display. Augmented and virtual reality displays may use a 3D light configuration directed at the retina that can be embedded on a head mounted device. An example device can comprise an integrated chip (e.g., optical phased array chip) as described herein embedded or otherwise attached (e.g., affixed) in a head mounted device (e.g., goggles, glasses, augmented reality display, virtual reality display) and/or other wearable device. The plurality of emitters can be disposed in a 2D configuration (e.g., using grating emitters) as disclosed herein. The plurality of emitters can be configured to allow for multiple focal planes. The plurality of emitters can be configured to account for retinal mapping and adjustment. The plurality of emitters can be configured to provide foveated imaging (e.g., which may implement different density of optical patterns across the image formed to better match one's vision).

Figure 4D:
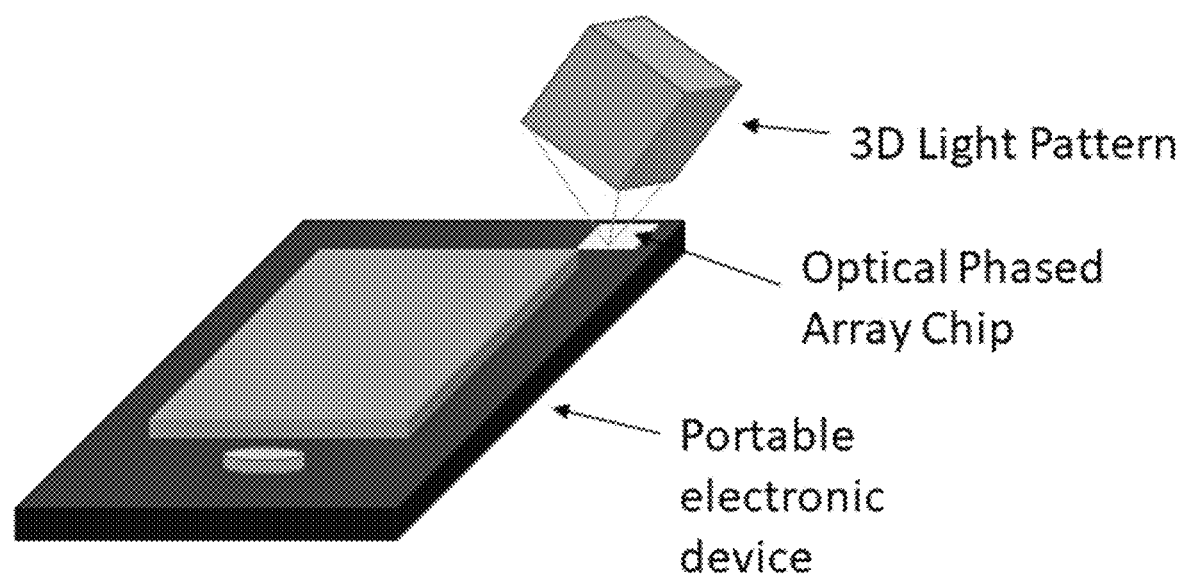
FIG. 4D shows an example device implemented for a volumetric device.

FIG. 4D shows an example device implemented for a volumetric display. An example device can comprise an integrated chip (e.g., optical phased array chip) as described herein embedded in a portable electronic device, such as a mobile phone, tablet, smart watch, wearable, consumer electronic, and/or the like. The plurality of emitters can be disposed in a 2D configuration (e.g., using grating emitters) as disclosed herein. The plurality of emitters can be configured to generate optical patterns in 3D (e.g., in the near field region). Similarly, this type of device could be embedded on endoscopy devices to medical procedures and diagnostics.

Different Fabrication Possibilities:

The waveguides are not limited to silicon nitride. This includes any material transparent in the visible wavelength regime.

The phase shifter is not limited to thermo-optic phase shifting. This includes any method to change the refractive index of light on an integrated chip.

The dimensions and arrangement of the waveguides, gratings, phase shifters and chip configuration can be different in order to optimize power consumption, signal to noise ratio of the beam, etc.

Commercial Opportunities Other than Imaging and Displays:

Quantum information processing based on optical trapping including quantum computers.

Biological sensing including cell flow cytometry.

Short-range, high resolution remote sensing.

The methods and systems described herein can comprise at least the following aspects.

Aspect 1. A device, comprising, consisting of, or consisting essentially of: a plurality of waveguides disposed on a chip; an interference structure optically coupled to the plurality of waveguides and configured to receive an optical signal and distribute (e.g., split) the optical signal to the plurality of waveguides as a plurality of optical signals; a plurality of phase shifters coupled to corresponding waveguides of the plurality of waveguides and configured to adjust the phase of one or more of the plurality of optical signals; and a plurality of emitters optically coupled to corresponding outputs of the plurality of phase shifters and configured to output, from the chip, the adjusted plurality of optical signals, wherein the adjusted plurality of optical signals are output as light patterns reconfigurable in at least one dimension.

Aspect 2. The device of Aspect 1, wherein the plurality of phase shifters comprise a plurality of heaters configured to adjust the phase by effecting a change in temperature in the corresponding waveguides.

Aspect 3. The device of any one of Aspects 1-2, wherein the plurality of waveguides comprise silicon nitride.

Aspect 4. The device of any one of Aspects 1-3, wherein the plurality of emitters are arranged as one or more of a one dimensional array or a two dimensional grid.

Aspect 5. The device of any one of Aspects 1-4, further comprising a plurality of interferometric structures optically coupled to corresponding waveguides of the plurality of waveguides and configured to effect amplitude modulation of the plurality of optical signals.

Aspect 6. The device of any one of Aspects 1-5, wherein the interference structure and the plurality of phase shifters are disposed on the chip.

Aspect 7. The device of any one of Aspects 1-6, wherein the plurality of emitters are configured to output the adjusted plurality of optical signals from an edge of the chip.

Aspect 8. The device of any one of Aspects 1-7, wherein the plurality of emitters comprise a plurality of grating structures configured to output the adjusted plurality of optical signals perpendicular to a surface of the chip, wherein the plurality of emitters are disposed on the surface.

Aspect 9. The device of any one of Aspects 1-8, wherein the plurality of emitters are randomly spaced.

Aspect 10. The device of any one of Aspects 1-9, wherein the plurality of emitters are disposed in an arrangement so as to eliminate grating lobes.

Aspect 11. The device of any one of Aspects 1-10, wherein the plurality of emitters are disposed in an arrangement configured, optionally by using a genetic algorithm, to maximize the peak sidelobe ratio (PSLR) of the beam formed.

Aspect 12. The device of any one of Aspects 1-11, wherein the adjusted plurality of optical signals output from the plurality of emitters are focused in a near field region.

Aspect 13. The device of any one of Aspects 1-12, wherein the adjusted plurality of optical signals output from the plurality of emitters comprise one or more of a line or a sheet of light.

Aspect 14. The device of Aspect 13, wherein the width of the sheet of light is diffraction limited.

Aspect 15. The device of any one of Aspects 1-14, wherein one or more of a dimension or an arrangement of one or more of the plurality of waveguides, the plurality of phase shifters, or the plurality of emitters is optimized for one or more of power consumption or signal-to-noise ratio of an output beam.

Aspect 16. The device of any one of Aspects 1-15, wherein the plurality of phase shifters are electronically controlled to reconfigure the light patterns.

Aspect 17. The device of any one of Aspects 1-16, wherein the light patterns are reconfigurable in one or more of two dimensions or of three dimensions.

Aspect 18. A method, comprising, consisting of, or consisting essentially of: receiving, via a first waveguide disposed on a chip, an optical signal; distributing (e.g., splitting) the optical signal to a plurality of second waveguides as a plurality of optical signals; adjusting the phase of one or more of the plurality of optical signals; and outputting, from the chip, the adjusted plurality of optical signals, wherein the adjusted plurality of optical signals are output as light patterns reconfigurable in at least one dimension.

Aspect 19. The method of Aspect 18, wherein distributing the optical signal and adjusting the phase are performed on the chip.

Aspect 20. The method of any one of Aspects 18-19, wherein outputting the adjusted plurality of optical signals comprises one more of focusing an output beam in a near field region, outputting a line of light, outputting a sheet of light, or outputting a spot of light.

Aspect 21. A device, comprising, consisting of, or consisting essentially of: a plurality of waveguides disposed on a chip; an interference structure optically coupled to the plurality of waveguides and configured to receive an optical signal and distribute the optical signal to the plurality of waveguides as a plurality of optical signals; a plurality of phase shifters coupled to corresponding waveguides of the plurality of waveguides and configured to adjust the phase of one or more of the plurality of optical signals; and a plurality of emitters optically coupled to corresponding outputs of the plurality of phase shifters and configured to output, from the chip, the adjusted plurality of optical signals, wherein the adjusted plurality of optical signals are projected into free-space as light patterns, in the visible wavelength range, wherein the light patterns are spatially reconfigurable in at least one dimension.

Aspect 22. The device of Aspect 21, wherein the plurality of phase shifters are configured to adjust the phase based on one or more of an electro-optic or a thermo-optic effect in the corresponding waveguides.

Aspect 23. The device of any one of Aspects 21-22, wherein the plurality of waveguides comprise silicon nitride.

Aspect 24. The device of any one of Aspects 21-23, wherein the plurality of emitters are arranged as one or more of a one dimensional array or a two dimensional grid.

Aspect 25. The device of any one of Aspects 21-24, wherein the interference structure comprises a plurality of interferometric structures optically coupled to corresponding waveguides of the plurality of waveguides and configured to effect amplitude modulation of the plurality of optical signals.

Aspect 26. The device of any one of Aspects 21-25, wherein the interference structure and the plurality of phase shifters are disposed on the chip.

Aspect 27. The device of any one of Aspects 21-26, wherein the plurality of emitters are configured to output the adjusted plurality of optical signals from an edge of the chip.

Aspect 28. The device of any one of Aspects 21-27, wherein the plurality of emitters comprise a plurality of grating structures configured to output the adjusted plurality of optical signals perpendicular to a surface of the chip, wherein the plurality of emitters are disposed on the surface.

Aspect 29. The device of any one of Aspects 21-28, wherein the plurality of emitters are one or more of sparsely spaced, aperiodically spaced, or spaced to achieve a uniform modulation transfer function.

Aspect 30. The device of any one of Aspects 21-29, wherein the plurality of emitters are disposed in an arrangement so as to eliminate grating lobes.

Aspect 31. The device of any one of Aspects 21-30, wherein the plurality of emitters are disposed in an arrangement configured, by using an optimization algorithm, to maximize the peak sidelobe ratio (PSLR) of a beam formed in the light patterns.

Aspect 32. The device of any one of Aspects 21-31, wherein the adjusted plurality of optical signals output from the plurality of emitters are one or more of focused in a reactive near field region, focused in a radiative near field region, or collimated in a far field region.

Aspect 33. The device of any one of Aspects 21-32, wherein the adjusted plurality of optical signals output from the plurality of emitters comprise one or more of a line or a sheet of light.

Aspect 34. The device of Aspect 33, wherein the chip is disposed in one or more of a portable device or an implantable device, Aspect 35. The device of any one of Aspects 21-34, wherein one or more of a dimension or an arrangement of one or more of the plurality of waveguides, the plurality of phase shifters, or the plurality of emitters is optimized for one or more of power consumption or signal-to-noise ratio of an output beam.

Aspect 36. The device of any one of Aspects 21-35, wherein the plurality of phase shifters are electronically controlled to reconfigure the light patterns.

Aspect 37. The device of any one of Aspects 21-36, wherein the light patterns are reconfigurable to form one or more of holographic features, two-dimensional images, or three-dimensional representations of objects.

Aspect 38. A method, comprising, consisting of, or consisting essentially of: receiving, via a first waveguide disposed on a chip, an optical signal; distributing the optical signal to a plurality of second waveguides as a plurality of optical signals; adjusting a phase of one or more of the plurality of optical signals; and outputting, from a plurality of emitters disposed on the chip, the adjusted plurality of optical signals, wherein the adjusted plurality of optical signals are projected into free-space as light patterns in the visible wavelength range, the chip is configured to spatially reconfigure the light patterns in at least one dimension.

Aspect 39. The method of Aspect 38, further comprising detecting one or more reflections of the adjusted plurality of optical signals projected into free-space.

Aspect 40. The method of any one of Aspects 38-39, wherein outputting the adjusted plurality of optical signals comprises one more of focusing an output beam in a near-field region, outputting a line of light, outputting a sheet of light, or outputting a spot of light.

Figure 5:
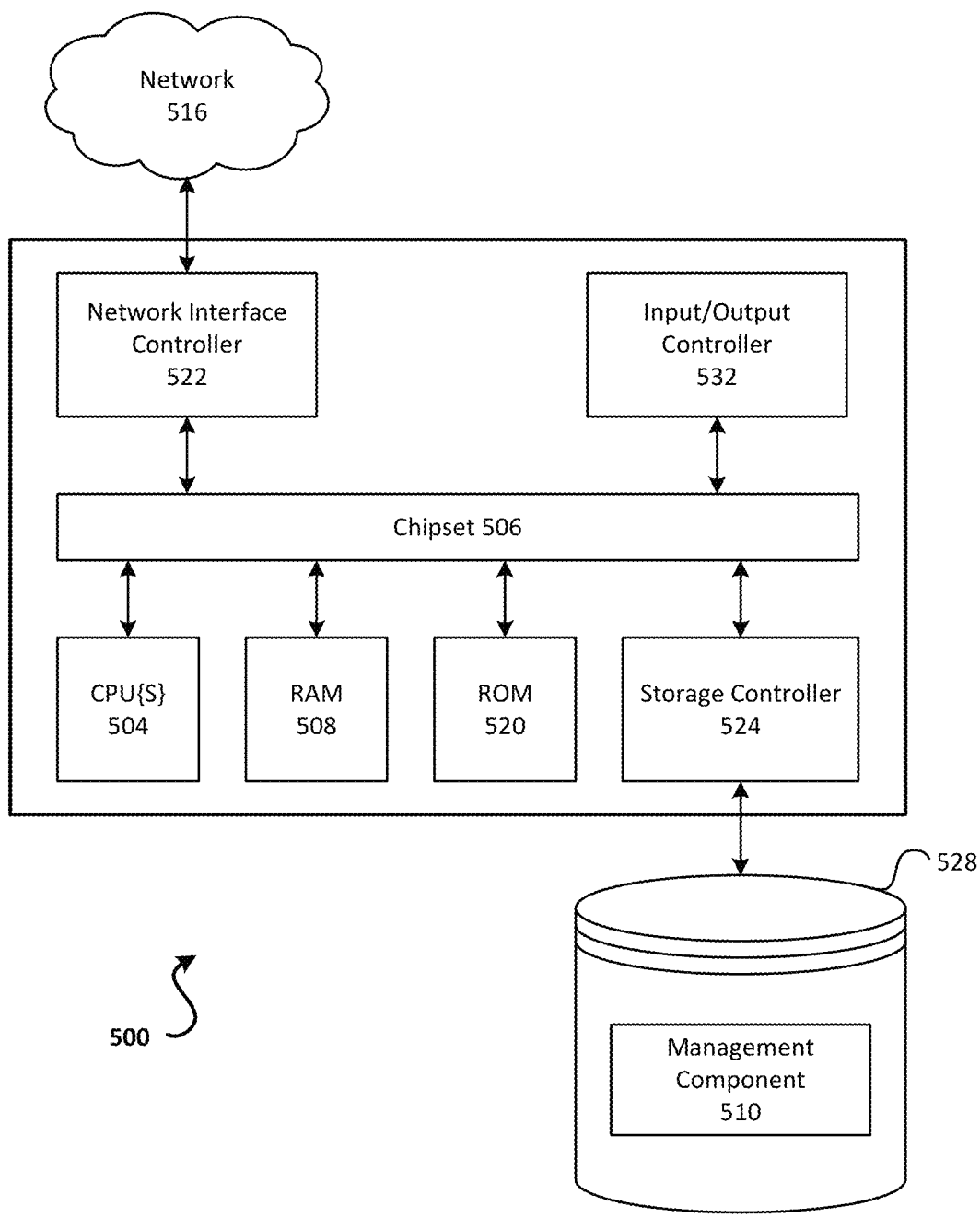
FIG. 5 is a block diagram illustrating an example computing device.

FIG. 5 depicts a computing device that can be used in various aspects, such implementing the device or application of the devices disclosed herein. The computer architecture shown in FIG. 8 shows a conventional server computer, workstation, desktop computer, laptop, tablet, network appliance, PDA, e-reader, digital cellular phone, or other computing node, and can be utilized to execute any aspects of the computers described herein, such as to implement the methods described herein.

The computing device 500 can include a baseboard, or "motherboard," which is a printed circuit board to which a multitude of components or devices can be connected by way of a system bus or other electrical communication paths. One or more central processing units (CPUs) 504 can operate in conjunction with a chipset 506. The CPU(s) 504 can be standard programmable processors that perform arithmetic and logical operations necessary for the operation of the computing device 500.

The CPU(s) 504 can perform the necessary operations by transitioning from one discrete physical state to the next through the manipulation of switching elements that differentiate between and change these states. Switching elements can generally include electronic circuits that maintain one of two binary states, such as flip-flops, and electronic circuits that provide an output state based on the logical combination of the states of one or more other switching elements, such as logic gates. These basic switching elements can be combined to create more complex logic circuits including registers, adders-subtractors, arithmetic logic units, floating-point units, and the like.

The CPU(s) 504 can be augmented with or replaced by other processing units, such as GPU(s) 505. The GPU(s) 505 can comprise processing units specialized for but not necessarily limited to highly parallel computations, such as graphics and other visualization-related processing.

A chipset 506 can provide an interface between the CPU(s) 504 and the remainder of the components and devices on the baseboard. The chipset 506 can provide an interface to a random access memory (RAM) 508 used as the main memory in the computing device 500. The chipset 506 can further provide an interface to a computer-readable storage medium, such as a read-only memory (ROM) 520 or non-volatile RAM (NVRAM) (not shown), for storing basic routines that can help to start up the computing device 500 and to transfer information between the various components and devices. ROM 520 or NVRAM can also store other software components necessary for the operation of the computing device 500 in accordance with the aspects described herein.

The computing device 500 can operate in a networked environment using logical connections to remote computing nodes and computer systems through local area network (LAN) 516. The chipset 506 can include functionality for providing network connectivity through a network interface controller (NIC) 522, such as a gigabit Ethernet adapter. A NIC 522 can be capable of connecting the computing device 500 to other computing nodes over a network 516. It should be appreciated that multiple NICs 522 can be present in the computing device 500, connecting the computing device to other types of networks and remote computer systems.

The computing device 500 can be connected to a mass storage device 528 that provides non-volatile storage for the computer. The mass storage device 528 can store system programs, application programs, other program modules, and data, which have been described in greater detail herein. The mass storage device 528 can be connected to the computing device 500 through a storage controller 524 connected to the chipset 506. The mass storage device 528 can consist of one or more physical storage units. A storage controller 524 can interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 500 can store data on a mass storage device 528 by transforming the physical state of the physical storage units to reflect the information being stored. The specific transformation of a physical state can depend on various factors and on different implementations of this description. Examples of such factors can include, but are not limited to, the technology used to implement the physical storage units and whether the mass storage device 528 is characterized as primary or secondary storage and the like.

For example, the computing device 500 can store information to the mass storage device 528 by issuing instructions through a storage controller 524 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 500 can further read information from the mass storage device 528 by detecting the physical states or characteristics of one or more particular locations within the physical storage units.

In addition to the mass storage device 528 described above, the computing device 500 can have access to other computer-readable storage media to store and retrieve information, such as program modules, data structures, or other data. It should be appreciated by those skilled in the art that computer-readable storage media can be any available media that provides for the storage of non-transitory data and that can be accessed by the computing device 500.

By way of example and not limitation, computer-readable storage media can include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that can be used to store the desired information in a non-transitory fashion.

A mass storage device, such as the mass storage device 528 depicted in FIG. 8, can store an operating system utilized to control the operation of the computing device 500. The operating system can comprise a version of the LINUX operating system. The operating system can comprise a version of the WINDOWS SERVER operating system from the MICROSOFT Corporation. According to further aspects, the operating system can comprise a version of the UNIX operating system. Various mobile phone operating systems, such as IOS and ANDROID, can also be utilized. It should be appreciated that other operating systems can also be utilized. The mass storage device 528 can store other system or application programs and data utilized by the computing device 500.

The mass storage device 528 or other computer-readable storage media can also be encoded with computer-executable instructions, which, when loaded into the computing device 500, transforms the computing device from a general-purpose computing system into a special-purpose computer capable of implementing the aspects described herein. These computer-executable instructions transform the computing device 500 by specifying how the CPU(s) 504 transition between states, as described above. The computing device 500 can have access to computer-readable storage media storing computer-executable instructions, which, when executed by the computing device 500, can perform the methods described herein.

A computing device, such as the computing device 500 depicted in FIG. 5, can also include an input/output controller 532 for receiving and processing input from a number of input devices, such as a keyboard, a mouse, a touchpad, a touch screen, an electronic stylus, or other type of input device. Similarly, an input/output controller 532 can provide output to a display, such as a computer monitor, a flat-panel display, a digital projector, a printer, a plotter, or other type of output device. It will be appreciated that the computing device 500 can not include all of the components shown in FIG. 5, can include other components that are not explicitly shown in FIG. 5, or can utilize an architecture completely different than that shown in FIG. 5.

As described herein, a computing device can be a physical computing device, such as the computing device 500 of FIG. 5. A computing node can also include a virtual machine host process and one or more virtual machine instances. Computer-executable instructions can be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that can be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that can be performed it is understood that each of these additional operations can be performed with any specific embodiment or combination of embodiments of the described methods.

As will be appreciated by one skilled in the art, the methods and systems can take the form of an entirely hardware embodiment, an entirely software embodiment, or an embodiment combining software and hardware aspects. Furthermore, the methods and systems can take the form of a computer program product on a computer-readable storage medium having computer-readable program instructions (e.g., computer software) embodied in the storage medium. More particularly, the present methods and systems can take the form of web-implemented computer software. Any suitable computer-readable storage medium can be utilized including hard disks, CD-ROMs, optical storage devices, or magnetic storage devices.

Embodiments of the methods and systems are described herein with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions can be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions can also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions can also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above can be used independently of one another, or can be combined in various ways. All possible combinations and sub-combinations are intended to fall within the scope of this disclosure. In addition, certain methods or process blocks can be omitted in some implementations. The methods and processes described herein are also not limited to any particular sequence, and the blocks or states relating thereto can be performed in other sequences that are appropriate. For example, described blocks or states can be performed in an order other than that specifically described, or multiple blocks or states can be combined in a single block or state. The example blocks or states can be performed in serial, in parallel, or in some other manner. Blocks or states can be added to or removed from the described example embodiments. The example systems and components described herein can be configured differently than described. For example, elements can be added to, removed from, or rearranged compared to the described example embodiments.

It will also be appreciated that various items are illustrated as being stored in memory or on storage while being used, and that these items or portions thereof can be transferred between memory and other storage devices for purposes of memory management and data integrity. Alternatively, in other embodiments, some or all of the software modules and/or systems can execute in memory on another device and communicate with the illustrated computing systems via inter-computer communication. Furthermore, in some embodiments, some or all of the systems and/or modules can be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures can also be stored (e.g., as software instructions or structured data) on a computer-readable medium, such as a hard disk, a memory, a network, or a portable media article to be read by an appropriate device or via an appropriate connection. The systems, modules, and data structures can also be transmitted as generated data signals (e.g., as part of a carrier wave or other analog or digital propagated signal) on a variety of computer-readable transmission media, including wireless-based and wired/cable-based media, and can take a variety of forms (e.g., as part of a single or multiplexed analog signal, or as multiple discrete digital packets or frames). Such computer program products can also take other forms in other embodiments. Accordingly, the present invention can be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

It will be apparent to those skilled in the art that various modifications and variations can be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

REFERENCES

1. Power, R. M. & Huisken, J. A guide to light-sheet fluorescence microscopy for multiscale imaging. Nature Methods 14, 360-373 (2017).
2. Sun, M.-J. et al. Single-pixel three-dimensional imaging with time-based depth resolution. Nature Communications 7, 12010 (2016).
3. Sun, B. et al. 3D Computational Imaging with Single-Pixel Detectors.
Science 340, 844-847 (2013).
4. August, Y. & Stern, A. Compressive sensing spectrometry based on liquid crystal devices. Opt. Lett., OL 38, 4996-4999 (2013).
5. Satat, G., Tancik, M. & Raskar, R. Lensless Imaging With Compressive Ultrafast Sensing. IEEE Transactions on Computational Imaging 3, 398-407 (2017).
6. Doylend, J. K. et al. Two-dimensional free-space beam steering with an optical phased array on silicon-on-insulator. Opt. Express, OE 19, 21595-21604 (2011).
7. Sun, J., Timurdogan, E., Yaacobi, A., Hosseini, E. S. & Watts, M. R. Large-scale nanophotonic phased array. Nature 493, 195-199 (2013).
8. Miller, S. A. et al. 512-Element Actively Steered Silicon Phased Array for Low-Power LIDAR. in Conference on Lasers and Electro-Optics (2018), paper JTh5C.2 JTh5C.2 (Optical Society of America, 2018). doi: 10.1364/CLEO_AT.2018.JTh5C.2
9. Komljenovic, T., Helkey, R., Coldren, L. & Bowers, J. E. Sparse aperiodic arrays for optical beam forming and LIDAR. Opt. Express, OE 25, 2511-2528 (2017).

What is claimed:
1. A device, comprising:
a plurality of waveguides disposed on a chip;
an interference structure optically coupled to the plurality of waveguides and configured to receive an optical signal and distribute the optical signal to the plurality of waveguides as a plurality of optical signals, wherein the interference structure comprises a plurality of interference elements, and each interference element has a single input and multiple outputs such that the plurality of optical signals are based on the optical signal;
a plurality of phase shifters coupled to corresponding waveguides of the plurality of waveguides and configured to adjust the phase of one or more of the plurality of optical signals; and
a plurality of emitters optically coupled to corresponding outputs of the plurality of phase shifters and configured to output, from the chip, the adjusted plurality of optical signals, wherein a spacing between the plurality of emitters is larger than a wavelength of the plurality of optical signals, and wherein the adjusted plurality of optical signals are projected into free-space as light patterns representing one or more shapes, in the visible wavelength range, wherein the light patterns are spatially reconfigurable, via directional steering, in at least one dimension.

2. The device of claim 1, wherein the plurality of phase shifters are configured to adjust the phase based on one or more of an electro-optic or a thermo-optic effect in the corresponding waveguides.

3. The device of claim 1, wherein the plurality of waveguides comprise silicon nitride.

4. The device of claim 1, wherein the plurality of emitters are arranged as one or more of a one dimensional array or a two dimensional grid.

5. The device of claim 1, wherein the interference structure comprises a plurality of interferometric structures optically coupled to corresponding waveguides of the plurality of waveguides and configured to effect amplitude modulation of the plurality of optical signals.

6. The device of claim 1, wherein the interference structure and the plurality of phase shifters are disposed on the chip.

7. The device of claim 1, wherein the plurality of emitters comprise a plurality of grating structures configured to output the adjusted plurality of optical signals perpendicular to a surface of the chip, wherein the plurality of emitters are disposed on the surface.

8. The device of claim 1, wherein the plurality of emitters are one or more of sparsely spaced, aperiodically spaced, or spaced to achieve a uniform modulation transfer function.

9. The device of claim 1, wherein the plurality of emitters are disposed in an arrangement so as to eliminate grating lobes.

10. The device of claim 1, wherein the plurality of emitters are disposed in an arrangement configured, by using an optimization algorithm, to maximize a peak sidelobe ratio (PSLR) of a beam formed in the light patterns.

11. The device of claim 1, wherein the adjusted plurality of optical signals output from the plurality of emitters are one or more of focused in a reactive near field region, focused in a radiative near field region, or collimated in a far field region.

12. The device of claim 1, wherein the adjusted plurality of optical signals output from the plurality of emitters comprise one or more of a line or a sheet of light.

13. The device of claim 12, wherein the chip is disposed in one or more of a portable device or an implantable device.

14. The device of claim 1, wherein one or more of a dimension or an arrangement of one or more of the plurality of waveguides, the plurality of phase shifters, or the plurality of emitters is optimized for one or more of power consumption or signal-to-noise ratio of an output beam.

15. The device of claim 1, wherein the plurality of phase shifters are electronically controlled to reconfigure the light patterns.

16. A method, comprising:
- receiving an optical signal via an interference structure optically coupled to a first waveguide disposed on a chip, wherein the interference structure comprises a plurality of interference elements, and each interference element has a single input and multiple outputs;
- distributing, via the interference elements the optical signal to a plurality of second waveguides as a plurality of optical signals based on the optical;
- adjusting a phase of one or more of the plurality of optical signals; and
- outputting, from a plurality of emitters disposed on the chip, the adjusted plurality of optical signals, wherein the adjusted plurality of optical signals are projected into free-space as light patterns representing one or more shapes in the visible wavelength range, the chip is configured to spatially reconfigure, via directional steering, the light patterns in at least one dimension, and wherein a spacing between the plurality of emitters is larger than a wavelength of the plurality of optical signals.

17. The method of claim 16, further comprising detecting one or more reflections of the adjusted plurality of optical signals projected into free-space.

18. The method of claim 16, wherein outputting the adjusted plurality of optical signals comprises one more of focusing an output beam in a near-field region, outputting a line of light in a direction different from a propagation direction, outputting a sheet of light, or outputting a spot of light.

19. The device of claim 1, wherein the one or more shapes are focused in the near-field region.

20. The device of claim 1, wherein the light patterns comprise one or more of a two-dimensional pattern or a three-dimensional pattern, and wherein the one or more shapes represent an object.

* * * * *